United States Patent [19]

Rosenblood et al.

[11] Patent Number: 5,029,371

[45] Date of Patent: Jul. 9, 1991

[54] LOCKING DEVICE FOR ELASTIC LACES

[76] Inventors: Kenneth L. Rosenblood, 2279 Parnell Ave., Los Angeles, Calif. 90064; Charlotte A. Hassett, 435 S. Almont Dr., Beverly Hills, Calif. 90212

[21] Appl. No.: 559,003

[22] Filed: Jul. 27, 1990

[51] Int. Cl.$^5$ .............................. F16G 11/00
[52] U.S. Cl. ........................... 24/712.9; 24/712.3; 24/115 G
[58] Field of Search ............ 24/712.9, 712.3, 713, 24/715.3, 712, 115 M, 115 G

[56] References Cited

U.S. PATENT DOCUMENTS

| | | | |
|---|---|---|---|
| 736,306 | 8/1903 | Smith | 24/712.9 |
| 2,036,482 | 4/1936 | Larson | 24/715.3 |
| 4,290,173 | 9/1981 | Herlau | 24/712.9 |
| 4,477,947 | 10/1984 | Lyons | 24/115 G |
| 4,715,094 | 12/1987 | Herdman | 24/712.3 |

*Primary Examiner*—Victor N. Sakran
*Attorney, Agent, or Firm*—Nilsson, Robbins, Dalgarn, Berliner, Carson & Wurst

[57] ABSTRACT

A locking device having two sets of pairs of aligned clamping teeth, each set holding one lace end of an elastic lace. Each pair of aligned clamping teeth has a lace insertion portion for snapping an elastic lace laterally through it into a lace holding portion. Last pairs of aligned clamping teeth are dimensioned to hold the elastic lace tighter than the remaining pairs. A pair of cleats may be used to clasp a shoe lace as it comes out of a shoe eyelet so that any further tensioning of the lace will not affect the tightness of the shoe. A shoe hook may also be placed on the back of the locking device.

20 Claims, 2 Drawing Sheets

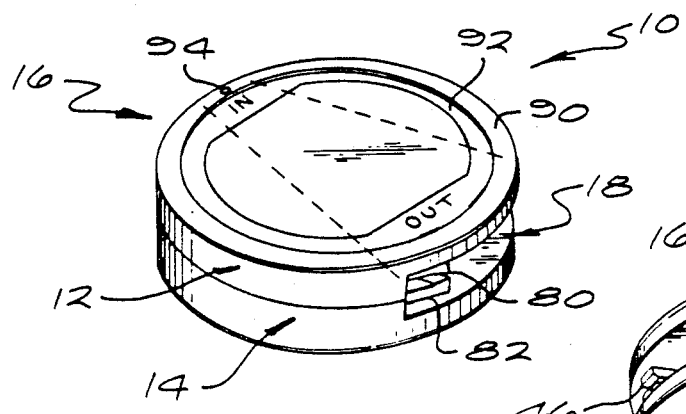
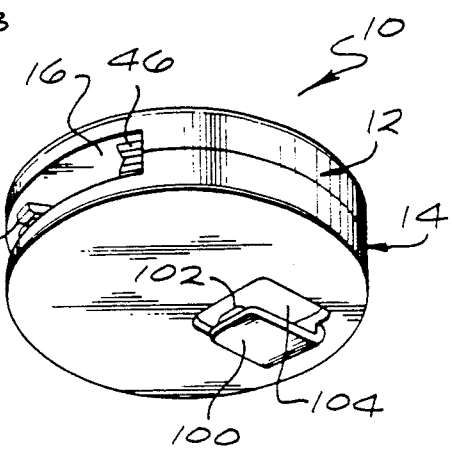
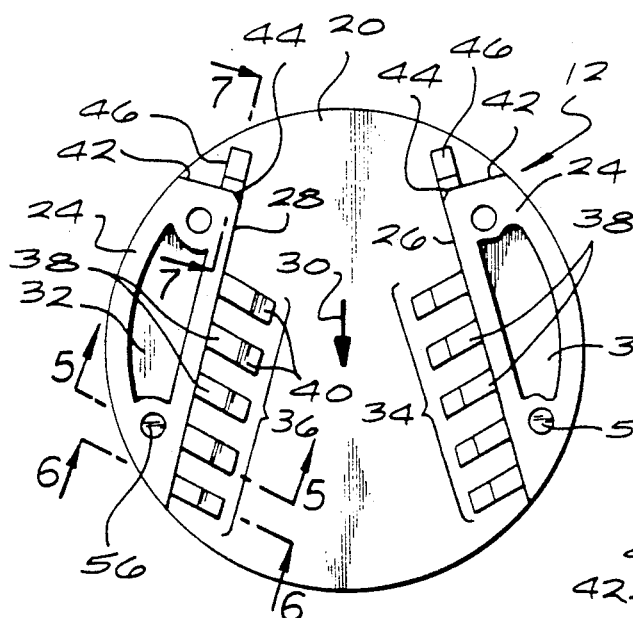
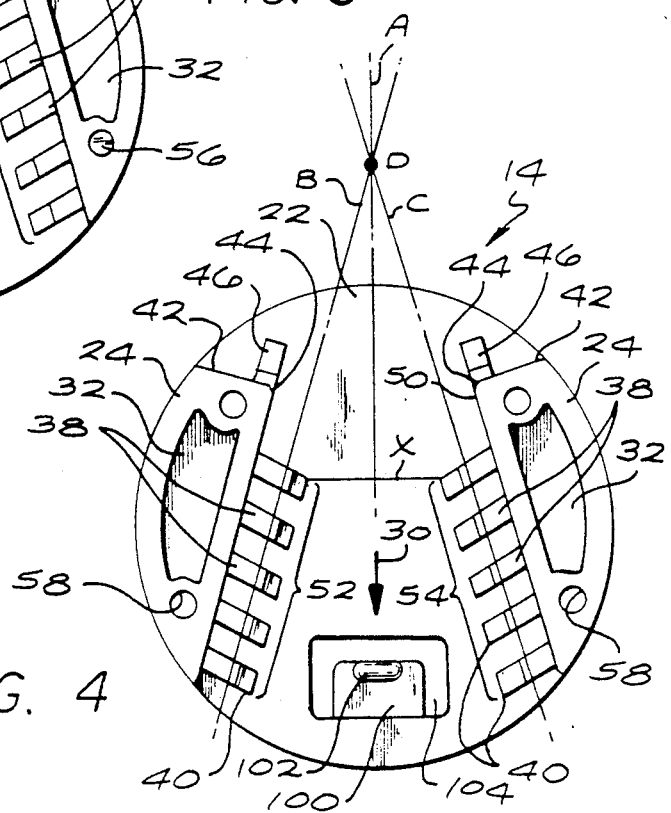

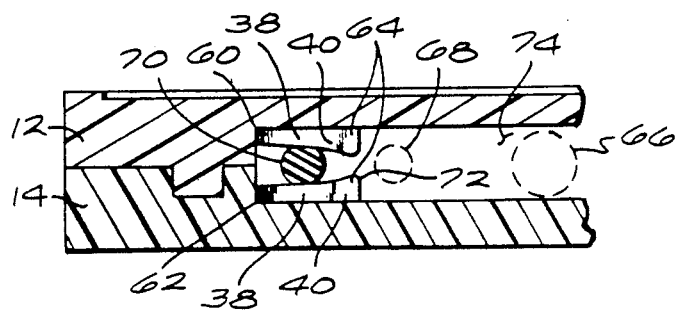
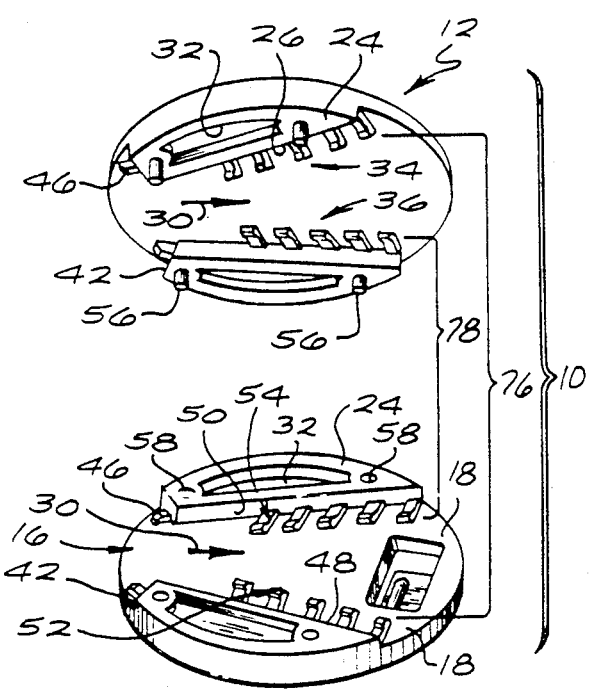
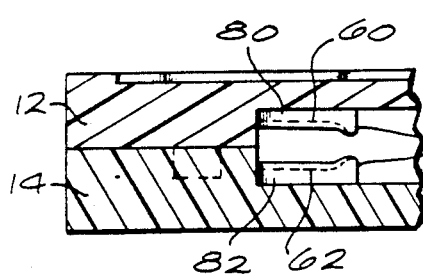
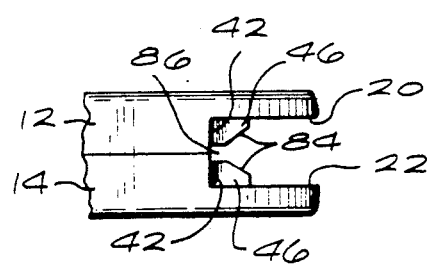
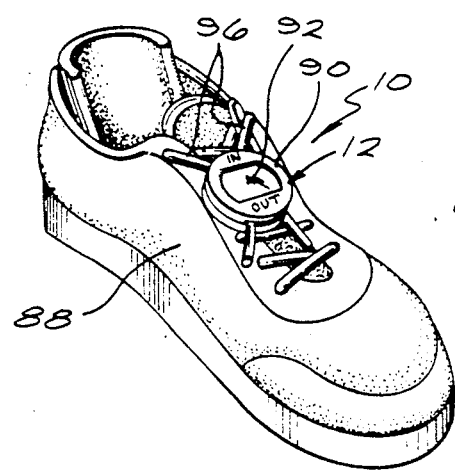

LOCKING DEVICE FOR ELASTIC LACES

This invention relates to a locking device for gripping and clamping elastic laces in a secure position and, in particular, to a locking device to be used with elastic shoe laces on shoes, especially athletic shoes.

BACKGROUND OF THE INVENTION

Typically, athletic footwear has been worn with conventional cotton shoe laces tied in a bow knot to hold the shoes to a person's feet. Loosening of the knot while walking or engaging in athletic activity inevitably occurs, resulting in the shoe not fitting as snugly as desired, or worse, the knot becoming completely undone, leaving the lace ends to flap about, possibly causing a misstep, stumble or fall.

Elastic laces have also been used on athletic shoes. Such laces are known to hold the shoe tightly and firmly to the foot, yet provide necessary yielding to slight variations in tension that accompanies walking or other athletic activity. See, for example, Larsen, U.S. Pat. No. 2,036,482 and Ivanhoe, U.S. Pat. No. 4,423,539. Elastic laces, however, suffer from the same disadvantages of cotton laces. They are also difficult to tie.

Devices presently exist for securing cotton shoe laces and preventing them from inadvertently becoming undone. See, for example, the following patents:

Boden, U.S. Pat. Nos. 3,845,875 and 4,102,019, describes a locking assembly comprised of a body member having a central passage through which the laces pass and a shiftable locking slide member for inserting into the passage to clamp the laces.

Yang, U.S. Pat. No. 4,393,550, describes a fastening member that utilizes a spring to hold the laces.

Mathes, U.S. Pat. No. 3,138,839, describes a device having a base and a cap wherein the laces are inserted through a hole in the base and pass out of the cap through two spaced holes. A knurled or roughened ball in the base prevents the laces from loosening.

Sales, U.S. Pat. No. 4,112,551, describes a cup element and a plug element which lock the laces between them.

The above locking devices have a number of disadvantages. Some require assembly by the user and/or time-consuming threading procedures. Others have moveable parts that wear out. Additionally, if it is desired to undo the laces, some of the devices require disassembling and, in the case of the Boden device, may require cutting the laces to remove the device. The above devices are even less effective with elastic laces due to the thickness and resiliency of elastic laces.

SUMMARY OF THE INVENTION

The present invention is a unitary lace locking device having no moving pieces. It is specifically designed to be effective with elastic laces. The user of the locking device described herein can easily and quickly clamp the elastic lace in a secure position by a simple flick of the wrist and can just as easily and quickly remove the laces from the device.

The basic elements of the present invention are pairs of aligned clamping teeth, each pair having a lace holding portion and a lace insertion portion. A lace is inserted by snapping it laterally through a small opening at the lace insertion portion of the teeth into a wider opening at the lace holding portion of the teeth.

The size of the opening formed by the pairs of aligned clamping teeth at the lace holding portion is smaller than the diameter of an unstretched (relaxed) elastic lace, thus providing a friction grip on the lace after it is inserted therein. The size of the opening formed by the pairs of aligned clamping teeth at the lace insertion portion is even smaller than the opening at the lace holding portion this prevents the lace from inadvertently coming out of the lace holding portion. The opening at the lace insertion portion, however, must be larger than the diameter of the elastic lace when fully stretched to allow the lace to pass through.

An even simpler embodiment of the locking device would only require two sets of clamping teeth placed in opposition to a gripping surface, such as sandpaper. Each tooth would still have a lace holding portion defining an opening between each tooth and the gripping surface. This opening would serve to secure the lace once it was inserted laterally therein.

In the preferred embodiment, using pairs of aligned clamping teeth, the device is used by inserting a lace into an entrance end of the locking device. The lace is initially positioned laterally to a series of pairs of aligned clamping teeth. The lace is then stretched to achieve the desired fit of the shoe on the foot and snapped laterally through the lace insertion portions into the lace holding portions which hold the lace in place. Removing the lace simply requires fully stretching the lace and snapping it back out through the lace insertion portions.

A last pair of aligned clamping teeth dimensioned to hold the lace tighter than the remaining pairs of aligned clamping teeth may also be used to reduce any possibility of slippage of the lace through the device. Each previous pair of aligned clamping teeth will individually support its share of the full tension force created by the stretched lace. Since the previous pairs of teeth are used to evenly disperse the tension force created by the stretched lace, the last pair of teeth may be used primarily to lock the lace into place. A tighter grip on the lace at this point is beneficial to prevent the lace from being inadvertently knocked out during athletic activity.

A feature which is especially advantageous when using the locking device on athletic shoes is a pair of lace guides forming a cleat at the lace entrance end of the device. The cleat is positioned to received the lace as it comes out of the top eyelet of the shoe and acts as a pivot point to turn the lace toward the pairs of aligned clamping teeth. The cleat may also be used to catch the lace as it comes out of the shoe so that any further tensioning of the lace required to snap the lace into the clamping teeth will not affect the tightness of the shoe.

A hook may also be placed on the back of the locking device for attaching the device to an already laced shoe string on the shoe. This will prevent the device from flopping about while walking or running.

The locking device may be made in numerous shapes. One advantageous shape is a disc having an upper and lower plate. The upper plate may be made with a depression for displaying advertising matter or corporate logos.

When used on any shoe, the user need only adjust the locking device once. The elastic laces will sufficiently stretch to allow the user to get into and out of the shoes without removing the device. Alternatively, the user may easily and quickly remove the device as often as desired, e.g., if the user desires a different shaped or colored locking devices or simply wishes to use a conventional knot. Finally, the user may simply wish to adjust the firmness of the shoe's fit on the foot. This is done by stretching the lace, removing it from the lace holding portion of the aligned clamping teeth (but not from the cleat or the lace passage), adjusting the lace to the desired tension and snapping the lace back into place.

Although described primarily in connection with shoes, especially athletic shoes, the locking device may be used with any device that employs an elastic drawstring, such as toiletry bags, garbage bags, storage bags or even hand bags.

BRIEF DESCRIPTION OF THE DRAWINGS

FIG. 1 is a perspective view from the lace exit end of the locking device.

FIG. 2 is a perspective view from the lace entrance end of the locking device.

FIG. 3 is a plan view of the inside of the upper portion of the locking device.

FIG. 4 is a plan view of the inside of the lower portion of the locking device.

FIG. 5 is a sectional view of a pair of aligned clamping teeth.

FIG. 6 is a sectional view of the last pair of aligned clamping teeth.

FIG. 7 is a side partial view of the lace guide members forming the cleat.

FIG. 8 is an exploded view of the locking device.

FIG. 9 is a perspective view of the locking device being used with an athletic shoe.

DETAILED DESCRIPTION

A locking device for elastic laces embodying the features of the present invention is shown in the figures generally as 10. The locking device may be made from a variety of materials such as molded plastic (e.g., polyethylene, ABS, or clear acrylic) or machined metal (e.g., aluminum).

Referring to FIGS. 1 and 2, the device is shown having a disc shape with an upper portion 12 and a lower portion 14. The device has a lace entrance end 16 which may be designated on the upper portion of the device itself by the word "in" or any other suitable designation. The device also has a lace exit end 18 (designated by the word "out" or the like).

Referring to FIGS. 3, 4, and 8, an inside surface 20 of the upper portion and an inside surface 22 of the lower portion, respectively, are shown. Projecting outwardly from the inside surface 20 of the upper portion is a pair of closure portions 24 each having a closure wall 26, 28, respectively, which cooperate to form a lace passage between them (see arrow at 30). The closure walls 26, 28 are perpendicular to the inside surface 20 of the upper portion. To save on material costs and to reduce the weight of the locking device, a recess area 32 may be formed in each closure portion 24.

Also projecting outwardly from the inside surface 20 of the upper portion are a first set of teeth 34 and a second set of teeth 36. Each tooth of the first set of teeth 34 is attached to and preferably extends perpendicularly from closure wall 26. Similarly, each tooth of the second set of teeth 36 is attached to and preferably extends perpendicularly from closure wall 28. Each tooth has a lace holding portion 38 and a lace insertion portion 40 which will be discussed in detail in connection with FIGS. 5 and 6.

Each closure portion 24 also has a guide wall 42 near the lace entrance end 16 of the upper portion 12. Each guide wall 42 is lateral to the lace passage 30 and together with the respective closure walls 26, 28 they form a pair of shoulder portions 44. Preferably, each guide wall 42 also has a lace guide member 46 extending perpendicularly from its respective guide wall 42. The lace guide member 46 will be discussed in detail in connection with FIG. 7.

In the preferred embodiment, the lower portion of the locking device is identical to the upper portion of the locking device in the following respects: both have matching closure portions 24, lace passages 30, recess areas 32, guide walls 42, shoulder portions 44 and lace guide members 46. The lower portion also has identical closure walls, indicated as 48, 50, and teeth (a third set of teeth indicated as 52 and a fourth set of teeth indicated as 54) having lace holding portions 38 and lace insertion portions 40. When assembled, the above mentioned elements of the lower portion and upper portion form a mirror image of each other.

The upper portion 12 and the lower portion 14 are assembled into a unitary piece through the use of bosses 56 on the upper portion and boss inserts 58 on the lower portion (see FIG. 8) forming a male/female snap. Sonic welding may also be used to melt the boss and boss insert together or the upper portion may be simply glued to the lower portion using male/female posts as guides.

Referring to FIG. 4, various imaginary axes are depicted. Axis A is shown running through the center of the lace passage 30. Axis B passes through the lace holding portions 38 of the third set of teeth 52 and intersects axis A at point D. Similarly, axis C passes through the lace holding portions 38 of the fourth set of teeth 54 and also intersects axis A at point D. Preferably, the angle between axis A and the other axes is approximately 15 degrees. Additionally, the angle between the guide walls 42 and their respective closure walls 48, 50 should preferably be 90 degrees. The distance x between the closest tooth of the third set of teeth 52 to the closest tooth of the fourth set of teeth 54 should be sufficient to readily allow the passing through of two elastic laces without tangling the laces together or tangling them with the individual teeth.

It should be recognized that a variety of configurations of the sets of teeth and the closure portions can be effectively used. For example, instead of a straight closure wall, a curved wall may be used. The angle between axis A and the other axes may be changed considerably, and even be greater than 90 degrees. The angle between the guide wall and closure wall may also be effectively changed. The number of teeth used may also vary.

Referring to FIG. 5, a tooth 60 from the first set of teeth 34 of the upper portion 12 is shown being opposed to and aligned with a second tooth 62 from the third set of teeth 52 of the lower portion 14 to form a pair of aligned clamping teeth 64. Teeth 60 and 62 are separated along their length to allow insertion of an elastic lace 70. Also shown are the lace insertion portions 40 and the lace holding portions 38 of the teeth.

The separation between the pair of aligned clamping teeth 64 at the lace insertion portions 40 is smaller than the separation between the pair of aligned clamping teeth at the lace holding portions 38. The lace insertion portions 40 thus prevent the lace 70 from leaving the lace holding portions 38 due to any slight movement of the lace. The teeth 60, 62 may also each have a rounded portion 72 to facilitate insertion of the lace through the lace insertion portion 40.

An elastic lace 66 in a relaxed state is shown in phantom in the locking device. The elastic lace itself may have a center of latex strands surrounded by a woven wrapping of polyester, polypropylene, wool, cotton or nylon. A desired elasticity factor of the lace is determined by the number and density of the latex strips and the weave of the outside covering. For use with athletic shoes, a desired elasticity factor is between 140% and 160%. As an example, an elasticity factor of 160% may have five thick latex strips and an elasticity factor of 140% may have twenty thin strips. The preferable length of the laces for athletic shoes will be standard lengths up to 54 inches. The outside diameter of the lace in a relaxed state is preferably four millimeters. For use in children's shoes, the diameter of the lace is preferably three millimeters and the elasticity may be increased to greater than 160%. The laces may also be tipped with a ¾ inch aglet which reduces the diameter of the tip of the lace by one millimeter.

As can be seen in FIG. 5, the size of the lace passages 30 of the upper portion 12 and the lower portion 14 cooperate to provide a combined lace passage area 74 for insertion of the elastic laces. The height of the combined lace passage area 74 should be greater than the diameter of the elastic lace 66. To secure the elastic lace in the locking device, the user will stretch the lace to reduce its diameter as shown at 68. At this point, the diameter of the lace will be approximately the size of or smaller than the separation between the teeth 60, 62 at the lace insertion portion 40, thus, allowing the user to pass the stretched lace laterally through the lace insertion portion 40, and snapping it into the lace holding portion 38 (lace shown at 70). Note that to be effective, the separation between the teeth 60, 62 at the lace holding portion 38 must be smaller than the diameter of the elastic lace in its relaxed state.

The remaining pairs of teeth associated with the first and third sets of teeth 34, 52 form a first series of pairs of aligned clamping teeth 76 and the pairs of teeth associated with the second and fourth sets of teeth 36, 54 form a second series of pairs of aligned clamping teeth 78. Locking two lace ends 96 of a lace (see FIG. 9) into the locking device 10 is quickly and easily done by inserting both ends of the lace through the lace entrance end 16 into the combined lace passage area 74 and out of the lace exit end 18. Next, the user snaps one lace end into the first series of pairs of aligned clamping teeth 76 and the other lace end into the second series of pairs of aligned clamping teeth 78. Once each lace end is inserted, each pair of aligned clamping teeth will support a portion of the full tension load created by the stretched lace and will evenly disburse the load throughout the device.

In the preferred embodiment, the last pair of aligned clamping teeth for each series of pairs, i.e., each pair nearest the lace exit end 18, is designed to clamp the elastic lace tighter than the remaining pairs of aligned clamping teeth in each series. Referring to FIGS. 1 and 6, teeth 80 and 82 are shown forming a last pair of aligned clamping teeth 98. Also shown, in phantom, is the previous pair of aligned clamping teeth 60, 62 (referred to in FIG. 5). As can be seen, the height of the teeth 80, 82 is greater than the height of the teeth 60, 62. In other words, the separation between teeth 80, 82 is less than the separation between teeth 60, 62. Thus, teeth 80, 82 will clamp the lace tighter than the previous pairs of aligned clamping teeth.

FIG. 7 depicts a detail showing the lace guide members 46 projecting outwardly from guide walls 42 and from the inside surfaces 20, 22 of the upper portion 12 and lower portion 14, respectively. As shown, the lace guide members 46 are opposed to and aligned with each other to form a cleat 84 for an elastic lace. Preferably, the cleat 84 is in the form of a "V". As shown, the lace guide members 46 may also be slightly separated at 86 to further grip and hold the lace after it passes through the cleat 84.

Referring to FIG. 9, the locking device 10 is shown attached to an athletic shoe 88. As shown, the upper portion 12 of the locking device may have a perimeter ridge 90 surrounding a central recessed area 92 wherein decals depicting advertisements, instructions, or corporate logos may be inserted. FIG. 1 shows an orientation dot 94 on the perimeter ridge 90 for orienting any such decals.

Referring to FIG. 2, the locking device also has a hook 100 extending from the lower portion 14 of the locking device 10 which is used to grab one of the already tied laces on the shoe and to thus hold the locking device against the shoe. The hook has a protuberance 102 at its end to more effectively hold the lace. A window 104 may be formed in the lower portion 14 of the locking device to assist the molding process. A thickened rib portion (not shown) may also be required where the hook connects to the lower portion to add strength. It will be appreciated that a variety of other means to grasp one of the tied laces to hold the locking device against the shoe may be used.

As shown in the above embodiment, the present invention discloses a locking device which may be easily and quickly used. The foregoing drawings and specifications merely are illustrative and describe a preferred embodiment of the invention. Many structural changes are possible and those changes are intended to be within the scope of this disclosure. Other embodiments and variations will occur to those skilled in the art and they are contemplated to be within the scope of the claims.

We claim:

1. A locking device for elastic laces comprising:
   an upper portion having an inside surface attached to a lower portion having an inside surface, said inside surfaces facing each other;
   a first set of teeth projecting outwardly from one of said inside surfaces and a first gripping surface on said other of said inside surfaces, each tooth of said first set of teeth having a lace holding portion that is in opposed relationship to and separated from said first gripping surface and having a lace insertion portion disposed on said tooth to permit an elastic lace to be inserted laterally past the lace insertion portion into the separation between the lace holding portion and the first gripping surface; and
   a second set of teeth projecting outwardly from one of said inside surfaces and a second gripping surface on said other of said inside surfaces, each tooth of said second set of teeth having a lace holding position that is in opposed relationship to and separated from said second gripping surface and having a lace insertion portion disposed on said tooth to permit an elastic lace to be inserted laterally past the lace insertion portion into the separation between the lace holding portion and the second gripping surface.

2. The locking device of claim 1 wherein:

said lace insertion portion of each tooth of said first set of teeth is separated from said first gripping surface and the separation between said lace insertion portion and said first gripping surface is less than the separation between said lace holding portion and said first gripping surface; and said lace insertion portion of each tooth of said second set of teeth is separated from said second gripping surface and the separation between said lace insertion portion and said second gripping surface is less than the separation between said lace holding portion and said second gripping surface.

3. A locking device for elastic laces comprising:

an upper portion having an inside surface, a first set of teeth projecting outwardly from said inside surface and a second set of teeth projecting outwardly from said inside surface;

a lower portion having an inside surface, a third set of teeth projecting outwardly from said inside surface and a fourth set of teeth projecting outwardly from said inside surface; and said upper portion attached to said lower portion and said first, second, third and fourth sets of teeth disposed on said respective insides surfaces such that said first set of teeth is opposed to, aligned with and separated from said third set of teeth to form a first series of pairs of aligned clamping teeth and said second set of teeth is opposed to, aligned with and separated from said fourth set of teeth to form a second series of pairs of aligned clamping teeth.

4. The locking device of claim 1 wherein:

one of the teeth of each pair of said first series of pairs of aligned clamping teeth has a lace insertion portion and a lace holding portion and for each pair of said teeth the separation of said teeth at the lace insertion portion is less than the separation of said teeth at the lace holding portion; and one of the teeth of each pair of said second series of pairs of aligned clamping teeth having a lace insertion portion and a lace holding portion and for each pair of said teeth the separation of said teeth at the lace insertion portion is less than the separation of said teeth at the lace holding portion.

5. The locking device of claim 4 further comprising a lace entrance end and a lace exit end and wherein the pair of teeth of the first series of pairs of aligned clamping teeth nearest the lace exit end has a smaller separation at the lace holding portion than any of the other pairs of said first series of pairs of aligned clamping teeth; and wherein the pair of teeth of the second series of pairs of aligned clamping teeth nearest the lace exit end has a smaller separation at the lace holding portion than any of the other pairs of said second series of pairs of aligned clamping teeth.

6. The locking device of claim 1 wherein each tooth of said first, second, third, and fourth set of teeth has a lace insertion portion and a lace holding portion, and for each pair of aligned clamping teeth the distance between the lace insertion portions is less than the distance between the lace holding portions.

7. The locking device of claim 6 wherein said first series of pairs of aligned clamping teeth and said second series of pairs of aligned clamping teeth define a combined lace passage between said series of pairs.

8. The locking device of claim 7 wherein said combined lace passage has a lace entrance end and a lace exit end and wherein the first series of pairs of aligned clamping and the second series of pairs of aligned clamping teeth diverge outwardly from the lace entrance end to the lace exit end.

9. The locking device of claim 8 wherein the pair of teeth of the first series of pairs of aligned clamping teeth nearest the lace exit end has a smaller separation at the lace holding portion than any of the other pairs of said first series of pairs of aligned clamping teeth; and wherein the pair of teeth of the second series of pairs of aligned clamping teeth nearest the lace exit end has a smaller separation at the lace holding portion than any of the other pairs of said second series of pairs of aligned clamping teeth.

10. The locking device of claim 7 wherein the first series of pairs of aligned clamping teeth and the second series of pairs of aligned clamping teeth are symmetrical about the middle of said combined lace passage.

11. The locking device of claim 1 further comprising a lace entrance end and a pair of cleat means, each cleat means attached to said upper portion and lower portion at said lace entrance end, one cleat means for engaging one end of said elastic lace and acting as a pivot point to turn said end toward the first series of pairs of aligned clamping teeth and the other cleat means for engaging the other end of said elastic lace and acting as a pivot point to turn said end towards the second series of pairs of aligned clamping teeth.

12. The locking device of claim 11 wherein each cleat means is a pair of lace guide members disposed on said upper portion and lower portion to form a V-notch.

13. The locking device of claim 12 wherein each of said pair of lace guide members is separated at the base of the V-notch.

14. The locking device of claim 1 further comprising a hook means projecting outwardly from an outside surface of said lower portion for securing said locking device to a laced object.

15. A locking device for elastic laces comprising:

an upper portion attached to a lower portion, said upper portion having an inside surface that faces an inside surface of said lower portion;

first and second sets of teeth projecting from the inside surface of said upper portion;

third and fourth sets of teeth projecting from the inside surface of said lower portion;

said first and second sets of teeth being opposed to aligned with and separated from said third and fourth sets of teeth, respectively, the first and third sets of teeth forming a first series of pairs of aligned clamping teeth and the second and fourth sets of teeth forming a second series of pairs of aligned clamping teeth;

a first lace passage adjacent said first series of pairs of aligned clamping teeth and a second lace passage adjacent said second series of pairs of aligned clamping teeth; and each tooth of each pair of said first and second series of pairs of aligned clamping teeth having a lace holding portion and a lace insertion portion, the separation between the teeth forming each pair of aligned clamping teeth being smaller between the lace insertion portions than between the lace holding portions.

16. The locking device of claim 15 further comprising a lace insertion end and a lace exit end wherein the first series of pairs of aligned clamping teeth and the first lace passage area extend from the lace insertion end to the lace exit end and the second series of pairs of aligned clamping teeth and the second lace passage area also extend from the lace insertion end to the lace exit end.

17. The locking device of claim 16 wherein each of the first and second series of pairs of aligned clamping teeth have a last pair of aligned clamping teeth, respectively, nearest the lace exit end, the separation between the teeth forming each of said last pairs of aligned clamping teeth being smaller between the lace holding portion than the separation between the teeth of the remaining pairs of aligned clamping teeth between their lace holding portions.

18. The locking device of claim 16 further comprising a first imaginary axis about which said first series of pairs of aligned clamping teeth is symmetrical to said second series of pairs of aligned clamping teeth.

19. The locking device of claim 18 wherein said first series of pairs of aligned clamping teeth is arranged in a row such that a second imaginary axis will pass through each of the openings formed by the teeth between the lace holding portions of said first series of pairs of aligned clamping teeth and wherein said second series of pairs of aligned clamping teeth is similarly arranged in a row such that a third imaginary axis will pass through each of the openings formed by the teeth between the lace holding portions of said second series of pairs of aligned clamping teeth.

20. The locking device of claim 19 wherein said first, second and third imaginary axes are in the same plane and are non-parallel.

* * * * *